(12) United States Patent
Nozaki et al.

(10) Patent No.: US 8,616,079 B2
(45) Date of Patent: Dec. 31, 2013

(54) SHIFT SWITCHING CONTROL DEVICE OF VEHICLE

(75) Inventors: Yoshinobu Nozaki, Anjo (JP); Naoki Itazu, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/504,191

(22) PCT Filed: Oct. 30, 2009

(86) PCT No.: PCT/JP2009/068697
§ 371 (c)(1),
(2), (4) Date: Apr. 26, 2012

(87) PCT Pub. No.: WO2011/052074
PCT Pub. Date: May 5, 2011

(65) Prior Publication Data
US 2012/0234124 A1 Sep. 20, 2012

(51) Int. Cl.
*F16H 61/28* (2006.01)
(52) U.S. Cl.
USPC .......................................... 74/335; 74/473.12
(58) Field of Classification Search
USPC ................................. 74/335, 473.12
See application file for complete search history.

(56) References Cited

U.S. PATENT DOCUMENTS

2009/0000411 A1* 1/2009 Nakayama et al. ............. 74/335

FOREIGN PATENT DOCUMENTS

| JP | 64-26057 | 1/1989 |
|---|---|---|
| JP | 2003-148601 | 5/2003 |
| JP | 2004-56857 | 2/2004 |
| JP | 2005-24044 | 1/2005 |
| JP | 2008-61378 | 3/2008 |
| JP | 2009-8153 | 1/2009 |
| JP | 2009-92081 | 4/2009 |

OTHER PUBLICATIONS

International Search Report in International Application No. PCT/JP2009/068697; Mailing Date: Nov. 24, 2009.

* cited by examiner

*Primary Examiner* — William C Joyce
(74) *Attorney, Agent, or Firm* — Finnegan, Henderson, Farabow, Garrett & Dunner, LLP (57) ABSTRACT

A shift switching control device of a vehicle including a shift switching mechanism that electrically switches a shift position of an automatic transmission with activation of a step motor based on an operation signal indicative of an operating state of an operating device for switching a shift position of the automatic transmission, wherein if a first shift switching control is provided that is determined in advance as shift position switching control giving higher priority to higher output of the step motor rather than responsiveness of switching of a shift position, the shift switching control device of a vehicle drives the step motor in a one-two-phase excitation mode and sets a rotation speed of the step motor to a predetermined first rotation speed, and wherein if a second shift switching control is provided that is determined in advance as shift position switching control giving higher priority to responsiveness of switching of a shift position rather than higher output of the step motor, the shift switching control device of a vehicle drives the step motor in a one phase excitation mode or a two phase excitation mode and sets a rotation speed of the step motor to a predetermined second rotation speed higher than the first rotation speed.

6 Claims, 8 Drawing Sheets

SHIFT SWITCHING CONTROL DEVICE OF VEHICLE

CROSS-REFERENCE TO RELATED APPLICATIONS

This application is a national phase application of International Application No. PCT/JP2009/068697, filed Oct. 30, 2009, the contents of which are incorporated herein by reference.

TECHNICAL FIELD

The present invention relates to a shift switching control device of a vehicle that electrically switches a shift position of an automatic transmission with activation of a step motor.

BACKGROUND ART

A shift switching control device of a vehicle is well known that includes a shift switching mechanism that electrically switches a shift position of an automatic transmission with activation of a step motor based on an operation signal indicative of an operating state of an operating device for switching a shift position of the automatic transmission. This is a shift switching control device called shift-by-wire (SBW), for example, and corresponds to a shift range changing device of an automatic transmission described in Patent Document 1 and a shift switching device described in Patent Document 2.

Figure 9:
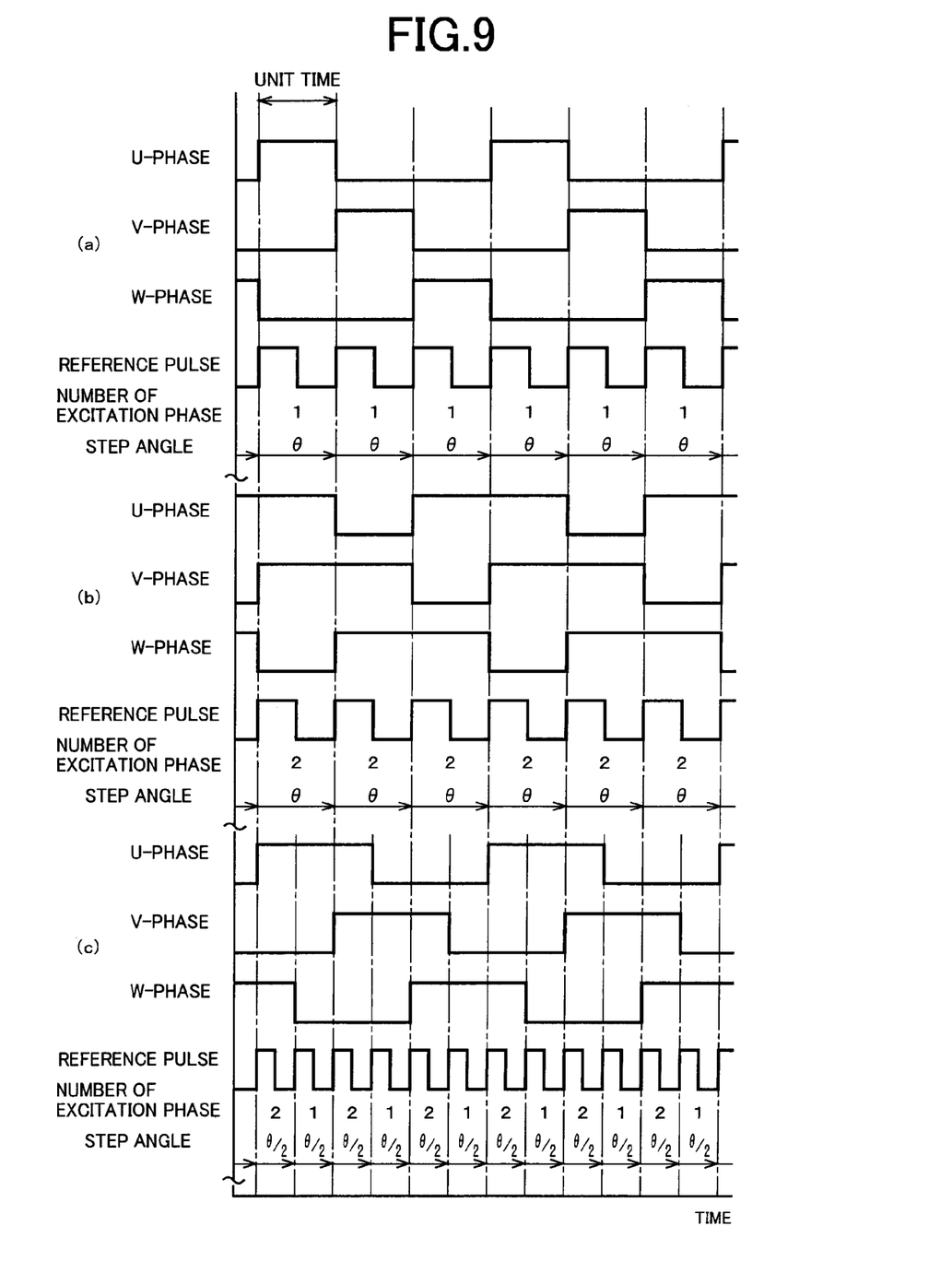
FIG. 9 is a diagram of an example of an excitation method when a three-phase step motor is used and (a), (b), and (c) are diagrams exemplarily illustrating the one-phase excitation mode, the two-phase excitation mode, the one-two-phase excitation mode, respectively.

In Patent Document 2, a three-phase switched reluctance motor (SR motor) is exemplarily illustrated as a step motor (stepping motor) acting as a drive source of a shift switching mechanism. Such a step motor can employ an excitation mode such as a one-phase excitation mode in which a current is sequentially applied only to one phase of windings as depicted in FIG. 9(a), a two-phase excitation mode in which a current is sequentially applied to two phases at the same time as depicted in FIG. 9(b), and a one-two-phase excitation mode in which one phase and two phases are alternatively switched to sequentially apply a current as depicted in FIG. 9(c), for example. In FIG. 9, for example, the excitation patterns of the excitation modes are set such that a step angle (rotation angle) per unit time of a rotor of a step motor is set to the same angle θ, i.e., the same motor rotation speed is achieved. Particularly if the one-two-phase excitation mode is employed, the excitations pattern is formed by combining the one-phase excitation and the two-phase excitation and, therefore, a step angle corresponding to a reference pulse is halved as compared to the case of the one-phase excitation mode or the two-phase excitation mode, thereby enabling smooth and fine motor rotation control. An output torque of the step motor becomes relatively large.

PRIOR ART DOCUMENTS

Patent Documents

Patent Document 1: Japanese Laid-Open Patent Publication No. 2005-24044
Patent Document 2: Japanese Laid-Open Patent Publication No. 2009-92081

SUMMARY OF THE INVENTION

Problem to Be Solved by the Invention

The step motor is disposed with, for example, an encoder that detects a rotation angle of the rotor, i.e., an encoder that continuously outputs a pulse signal in synchronization with the rotation of the rotor. The rotation position of the rotor is detected based on a count value of the pulse signal output from the encoder, and a conduction phase is switched in a predetermined order to rotationally drive the step motor. In the one-two-phase excitation mode, a step angle is halved as compared to the case of the one-phase excitation mode or the two-phase excitation mode while a drive pulse (communication pulse) must be doubled as compared to the one-phase excitation mode and the two-phase excitation mode, and a processing load is increased in an arithmetic processing unit (CPU, ECU) for motor control. Therefore, since the processing load associated with interruption of the pulse signal of the encoder is more increased particularly when the rotation speed of the step motor becomes higher, the arithmetic processing unit (CPU, ECU) for motor control is required to have higher processing capacity and the processing capacity of CPU must be increased in the one-two-phase excitation mode as compared to the one-phase excitation mode and the two-phase excitation mode. If higher-performance CPU is used by, for example, switching 16-bit CPU to 32-bit CPU only for dealing with the high-speed rotation control of the step motor in the one-two-phase excitation mode, costs are increased and, therefore, it is desirable to reduce the processing load of CPU as far as possible while ensuring the output torque of the step motor necessary for switching a shift position.

Description will be made of considerations given in terms of a specific form in a vehicle in the course of finding out a means for solving the problem. For example, while a vehicle stops on a slope road, when the shift position is at a parking position, at which a locking state is achieved by a locking tooth engaging with rotating teeth that rotate together with wheels, if the shift position is switched from the parking position to a non-parking position, at which the locking state is released, necessary torque of the step motor of the shift switching mechanism is thought to be highest. On the other hand, in shift switching other than the shift switching from the parking position to the non-parking position, the shift position can be switched if torque exists for activating a manual valve of an automatic transmission or activating the shift switching mechanism in a direction causing the locking tooth to engage with the rotating teeth, for example, and, as compared to the case of releasing the locking state, significantly lower torque is sufficient for the necessary torque of the step motor of the shift switching mechanism. In the shift switching other than the shift switching from the parking position to the non-parking position, responsiveness of switching of a shift position may be required rather than larger motor torque. For example, if a brake is turned off at the same time with a predetermined operation for making the switch to the parking position from a running position (e.g., "D" position) in a brake-on state on a slope road, the vehicle may move on the slope rode until the locking state is achieved and, therefore, it is desired to switch to the parking position quickly in a responsive manner.

The output property of the step motor necessary for switching a shift position is different depending on a type of switching of the shift position. The higher output torque of the step motor is more necessary than the responsiveness of switching of a shift position (higher-speed rotation of the step motor) in some cases and, conversely, the responsiveness of switching of a shift position (higher-speed rotation of the step motor) is more necessary than the higher output torque of the step motor in other cases. Therefore, if the control method of the step motor is defined in a single uniform way regardless of a type of the switching of a shift position, the processing capacity of CPU must be increased only for certain shift switching control. Such a problem is not known and no proposal has been made on switching a step motor control method depending on a type of the switching of the shift position for satisfying both the output property of the step motor necessary for switching a shift position and the processing load reduction in CPU.

The present invention was conceived in view of the situations and it is therefore an object of the present invention to provide a shift switching control device of a vehicle capable of satisfying both the output property of the step motor necessary for switching a shift position and the processing load reduction in CPU.

Means for Achieving the Object

The object indicated above is achieved according to the present invention, which provides (a) a shift switching control device of a vehicle including a shift switching mechanism that electrically switches a shift position of an automatic transmission with activation of a step motor based on an operation signal indicative of an operating state of an operating device for switching a shift position of the automatic transmission, wherein (b) if a first shift switching control is provided that is determined in advance as shift position switching control giving higher priority to higher output of the step motor rather than responsiveness of switching of a shift position, the shift switching control device of a vehicle drives the step motor in a one-two-phase excitation mode and sets a rotation speed of the step motor to a predetermined first rotation speed, and wherein (c) if a second shift switching control is provided that is determined in advance as shift position switching control giving higher priority to responsiveness of switching of a shift position rather than higher output of the step motor, the shift switching control device of a vehicle drives the step motor in a one phase excitation mode or a two phase excitation mode and sets a rotation speed of the step motor to a predetermined second rotation speed higher than the first rotation speed.

Advantages of the Invention

Accordingly, if the first shift switching control is provided that gives higher priority to the higher output of the step motor rather than the responsiveness of switching of the shift position, the step motor is driven in the one-two-phase excitation mode and the rotation speed of the step motor is turned to the predetermined first rotation speed set as a lower rotation speed than the predetermined second rotation speed and, therefore, the output torque of the step motor necessary for switching the shift position can be acquired and the CPU processing load is suppressed since a lower speed rotation of the step motor is sufficient even in the one-two-phase excitation mode, which increases the processing load of the CPU as compared to the one-phase excitation mode or the two-phase excitation mode. On the other hand, if the second shift switching control is provided that gives higher priority to the responsiveness of switching of the shift position rather than the higher output of the step motor, the step motor is driven in the one-phase excitation mode or the two-phase excitation mode and the rotation speed of the step motor is turned to the predetermined second rotation speed set as a higher rotation speed than the predetermined first rotation speed and, therefore, the rotation speed of the step motor necessary for switching the shift position can be acquired and the CPU processing load is suppressed since the one-phase excitation mode or the two-phase excitation mode is used that causes a lower processing load of the CPU as compared to the one-two-phase excitation mode if the step motor is turned to a higher rotation speed. As described above, the switching of the rotation speed and the excitation method (excitation system) of the step motor depending on a type of the shift position switching can satisfy both the output property of the step motor necessary for switching the shift position and the processing load reduction in the CPU. Therefore, for example, the processing load of the vehicle on-board CPU can be reduced and an inexpensive system can be established by lowering the grade (performance) of the CPU, for example, by changing a 32-bit CPU to a 16-bit CPU.

Preferably, the first shift switching control is switching control from a parking position that achieves a locked state with a locking tooth engaged with rotating teeth that rotate together with a wheel, to a non-parking position, and the second shift switching control is switching control from the non-parking position to the parking position. Accordingly, the switching control from the parking position to a non-parking position is appropriately provided that may require the high output torque of the step motor rather than the responsiveness of switching of the shift position. The switching control from a non-parking position to the parking-position is appropriately provided that may require the responsiveness of switching of the shift position rather than the high output torque of the step motor.

Preferably, the second shift switching control is shift position switching control other than the switching control from the parking position to the non-parking position. Accordingly, the shift position switching control other than the switching control from the parking-position to a non-parking position is appropriately provided that does not relatively require the high output torque of the step motor.

Preferably, the step motor is a three-phase step motor. Accordingly, the switching of the motor rotation speed and the excitation method of the three-phase step motor depending on a type of the shift position switching can satisfy both the output property of the step motor necessary for switching the shift position and the processing load reduction in the CPU.

Preferably, the vehicle includes a vehicle power transmission device such as the automatic transmission on the power transmission path from the power source to the drive wheels. Although, for example, an internal-combustion engine generating power through combustion of fuel such as a gasoline engine and a diesel engine is preferably used for the power source, other motors such as an electric motor may be employed solely or in combination with the engine.

Preferably, the vehicle power transmission device is made up of a single automatic transmission, an automatic transmission having a torque converter and a plurality of gear ratios, or a reduction gear mechanism portion and a differential mechanism portion in addition to the automatic transmission etc. The automatic transmission is made up of various planetary gear type automatic transmissions having, for example, four forward speeds, five forward speeds, six forward speeds, or more gear stages with a plurality of sets of rotating elements of planetary gear devices selectively coupled by an engagement device to achieve a plurality of gear stages (shift stages) in an alternative manner; a synchronous meshing type parallel two-shaft transmission that includes pairs of always engaging change gears between two shafts to put one of the pairs of the change gears into a power transmission state by a synchronizing device in an alternative manner; a synchronous meshing type parallel two-shaft automatic transmission that is the synchronous meshing type parallel two-shaft transmission capable of automatically switching a shift stage by a synchronizing device driven by a hydraulic actuator; an automatic transmission that is a so-called belt type continuously variable transmission that has a transmission belt acting as a power transmission member wrapped around a pair of variable pulleys having a variable effective diameter so as to continuously vary a gear ratio in a stepless manner; an automatic transmission that is a so-called traction type continuously variable transmission that has a pair of cones rotated around a common shaft center and a plurality of rollers capable of rotating around a rotation center intersecting with the shaft center such that the rollers are interposed and pressed between the pair of the cones to change an intersection angle between the rotation center of the rollers and the shaft center so as to vary a gear ratio; an automatic transmission that includes a differential mechanism made up of, for example, a planetary gear device distributing the power form the engine to a first electric motor and an output shaft, and a second electric motor disposed on the output shaft of the differential mechanism, and that acts as an electric continuously variable transmission with a gear ratio electrically changed by mechanically transmitting a main portion of the power from the engine toward drive wheels with the differential action of the differential mechanism and electrically transmitting the remaining portion of the power from the engine by using an electric path from the first electric motor to the second electric motor; or an automatic transmission mounted on a so-called parallel hybrid vehicle that includes an electric motor on an engine shaft, an output shaft, etc., in a power transmittable manner.

Although the rotating teeth are preferably fixed to, for example, the output rotating member of the automatic transmission, the rotating teeth can be fixed to another rotating member within a directly coupled range held in a power transmittable manner for the drive wheels.

MODE FOR CARRYING OUT THE INVENTION

Figure 1:
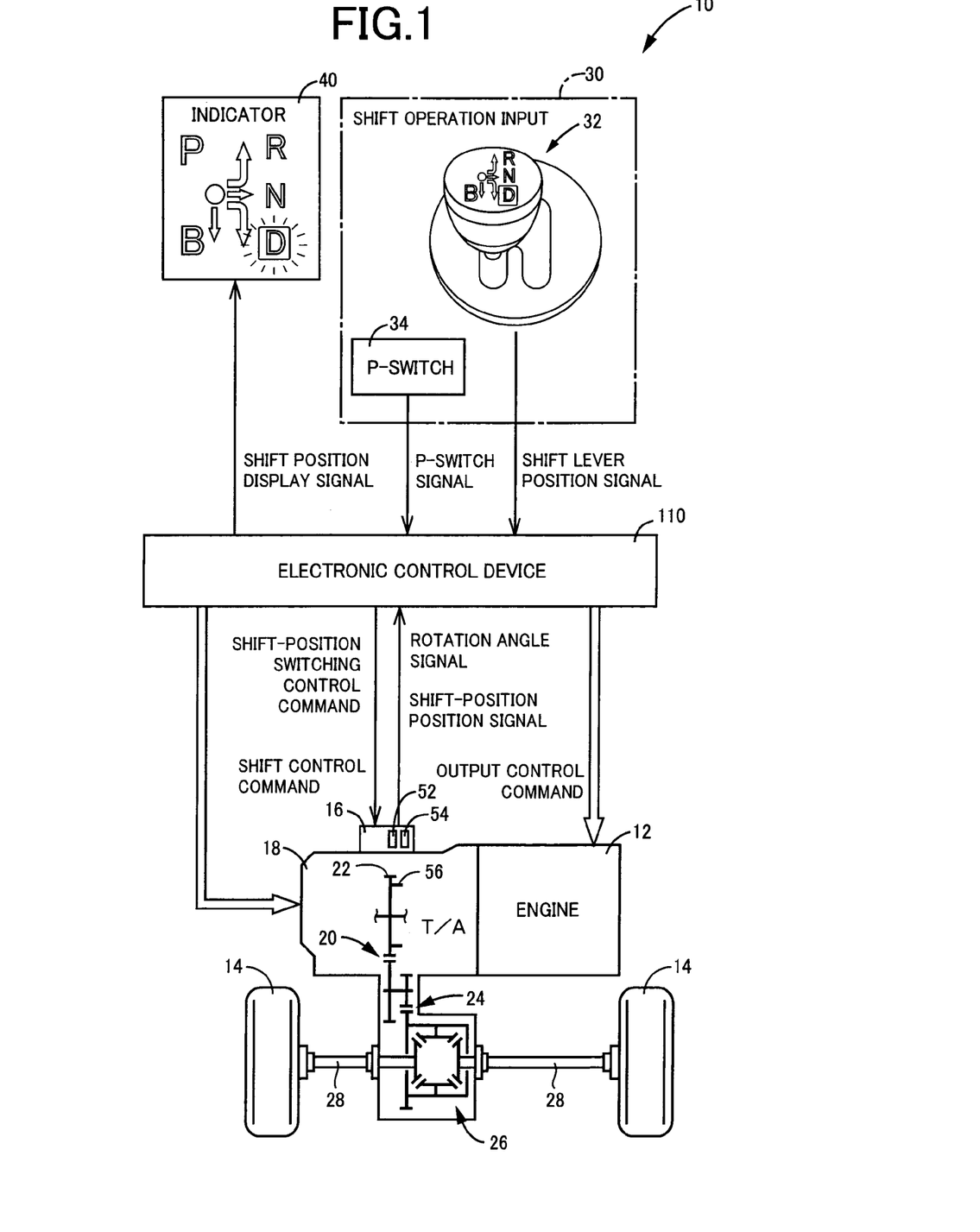
FIG. 1 is a diagram for explaining a general configuration of a power transmission path making up a vehicle to which the present invention is applied and is a block line diagram for explaining a main portion of a control system disposed on the vehicle for controlling switching of the shift position of the automatic transmission.

An embodiment of the present invention will now be described in detail with reference to the drawings.
Embodiment FIG. 1 is a diagram for explaining a general configuration of a power transmission path from an engine 12 to drive wheels 14 making up a vehicle 10 to which the present invention is applied and is a block line diagram for explaining a main portion of a control system disposed on the vehicle 10 for controlling a shift switching mechanism 16. In FIG. 1, the vehicle 10 includes the shift switching mechanism 16, an automatic transmission 18, a shift operating device 30, etc., and employs a shift-by-wire (SBW) mode in which a shift position (shift range) of the automatic transmission 18 is switched under electric control. The automatic transmission 18 is preferably used in, for example, an FF (front-engine front-drive) vehicle having the automatic transmission mounted transversely on the vehicle and transmits the power of the engine 12, which is an internal-combustion engine acting as a drive force source for running, from an output gear 22 acting as an output rotating member of the automatic transmission 18 making up one gear of a counter gear pair 20 sequentially through the counter gear pair 20 acting as a power transmission device, a final gear pair 24, a differential gear device (differential gear) 26, and a pair of axles 28 (drive shafts (D/S)) to a pair of the drive wheels 14. A transaxle (T/A) is made up of the automatic transmission 18, the counter gear pair 20, the final gear pair 24, the differential gear device (differential gear) 26, etc.

The vehicle 10 also includes an electronic control device 110 that includes a shift switching control device for controlling an activation state of the shift switching mechanism 16. The electronic control device 110 includes a so-called microcomputer including CPU, RAM, ROM, and I/O interface, for example, and the CPU executes signal processes in accordance with programs stored in advance in the ROM, while utilizing a temporary storage function of the RAM, to provide the output control of the engine 12, the shift control of the automatic transmission 18, the switching control of the activation state of the shift switching mechanism 16, i.e., the switching control of the shift position of the automatic transmission 18 using the shift-by-wire mode.

The electronic control device 110 is supplied with, for example, operation signals indicative of an operation state of the shift operating device 30 acting as an operating device for switching the shift position of the automatic transmission 18, and position signals indicative of an activation state of the shift switching mechanism 16 for electrically switching the shift position of the automatic transmission 18 with activation of a drive motor 50. The operation signals of the shift operating device 30 include a shift lever position signal corresponding to an operation position (operation position) $P_{SH}$ of a shift lever 32 and a P-switch signal indicative of an operation state of a P-switch 34, for example. The position signals of the shift switching mechanism 16 include a rotation angle signal indicative of a rotation angle of the drive motor 50 from an encoder 52 and a shift-position position signal from a neutral switch sensor 54, for example.

The electronic control device 110 outputs an engine output control command signal for the output control of the engine 12, a shift control command signal for the shift control of the automatic transmission 18, a shift position switching control command signal for switching the shift position of the automatic transmission 18, i.e., for the switching control of the shift switching mechanism 16, and a shift position display signal for activating an indicator (displaying device) 40 to display a switching state of the shift position in the automatic transmission 18, for example.

For example, the electronic control device 110 outputs a shift position switching control command to the shift switching mechanism 16 based on the shift lever position signal corresponding to the operation position $P_{SH}$ from a shift sensor 36 and a select sensor 38 and the P-switch signal from the P-switch 34 to control the activation of the shift switching mechanism 16 and electrically switch the shift position of the automatic transmission 18. The electronic control device 110 judges the shift position of the automatic transmission 18 based on the position signal from the shift switching mechanism 16. The electronic control device 110 outputs to the indicator 40 the shift position display signal for displaying a state of the shift position. The indicator 40 displays the state of the shift position of the automatic transmission 18 based on the shift position display signal output by the electronic control device 110.

Figure 2:
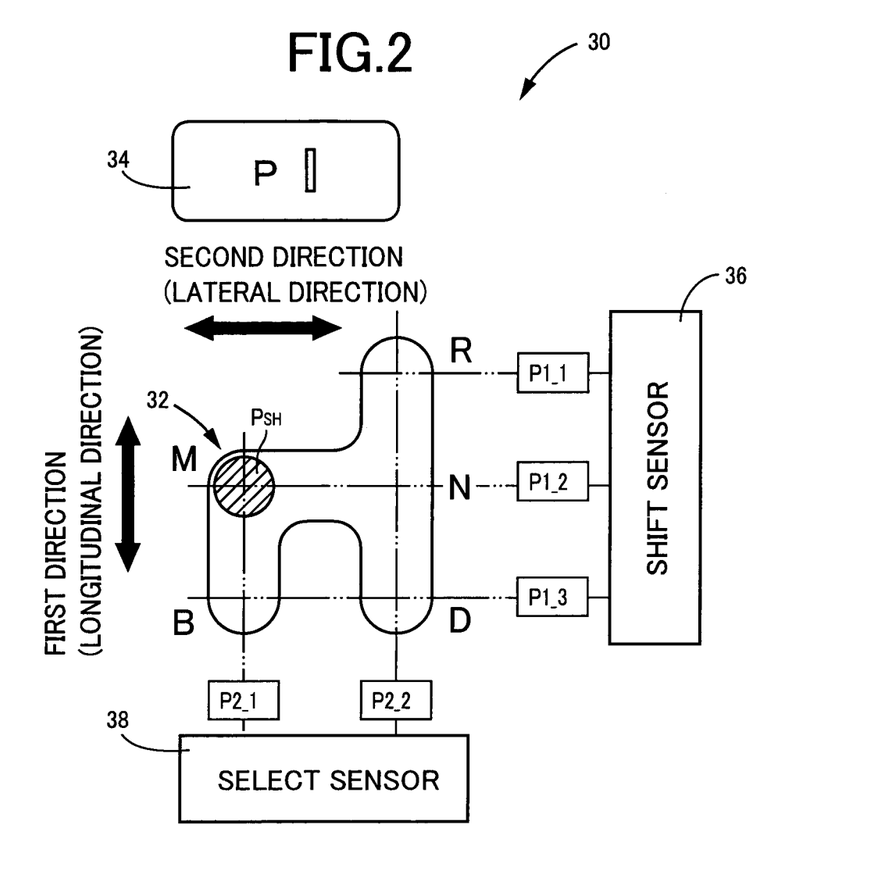
FIG. 2 is a diagram of an example of the shift operating device for switching a plurality of types of the shift position in the automatic transmission 18 with artificial operation.

FIG. 2 is a diagram of an example of the shift operating device 30 as a switching device (operating device) for switching a plurality of types of the shift position in the automatic transmission 18 with artificial operation. The shift operating device 30 includes a shift lever 32 disposed near a driver's seat, for example, and acting as a momentary operator operated to a plurality of the operation positions $P_{SH}$, i.e., an automatically returning operator that automatically returns to an original position (initial position) when an operation force is canceled. The shift operating device 30 of this embodiment includes the P-switch 34 as another switch near the shift lever 32 acting as a momentary operator for switching the shift position of the automatic transmission 18 from a non-P position other than a parking position (P-position) to the parking position.

The shift lever 32 is operated to each of three operation positions $P_{SH}$ disposed in the front-back direction or up-down direction, i.e., the longitudinal direction, of a vehicle, as depicted in FIG. 2, which are an R-operation position (R-operation position), an N-operation position (N-operation position), and a D-operation position (D-operation position) as well as an M-operation position (M-operation position) and B-operation position (B-operation position) arranged in parallel therewith, and outputs the shift lever position signal corresponding to the operation positions $P_{SH}$ to the electronic control device 110. The shift lever 32 can be operated in the longitudinal direction between the R-operation position, the N-operation position, and the D-operation position, can be operated in the longitudinal direction between the M-operation position and the B-operation position, and can be operated in the lateral direction of the vehicle orthogonal to the longitudinal direction between the N-operation position and the B-operation position.

The P-switch 34 is a momentary push-button switch, for example, and outputs the P-switch signal to the electronic control device 110 each time a user performs a push-in operation. For example, if the P-switch 34 is pushed when the shift position of the automatic transmission 18 is a non-P position, the shift position is switched to the P-position based on the P-switch signal given that a predetermined condition such as a vehicle speed V equal to or lower than a P-lock permission vehicle speed Vp is satisfied. The P-position is a parking position at which the power transmission path is interrupted in the automatic transmission 18 while the shift switching mechanism 16 performs a parking lock (P-lock) to mechanically prevent the rotation of the drive wheels 14.

The M-operation position of the shift operating device 30 is the initial position (home position) of the shift lever 32 and, even if a shift operation is performed to the operation positions $P_{SH}$ (R-, N-, D-, and B-operation positions) other than the M-operation position, when a driver releases the shift lever 32, i.e., an external force acting on the shift lever 32 disappears, the shift lever 32 returns to the M-operation position due to a mechanical mechanism such as a spring. When the shift operating device 30 is shift-operated to each of the operation positions $P_{SH}$, the electronic control device 110 makes the switch to the shift position of the automatic transmission 18 corresponding to the operation position $P_{SH}$ after the shift operation based on the shift lever position signal corresponding to the operation position $P_{SH}$, and the indicator 40 displays the current state of the shift position.

Describing the shift positions, a reverse position (R-position) selected by the shift operation of the shift lever 32 to the R-operation position is a backward running position at which a drive force causing a vehicle to run backward is transmitted to the drive wheels. A neutral position (N-position) selected by the shift operation of the shift lever 32 to the N-operation position is a neutral position for achieving a neutral state, in which the power transmission path in the automatic transmission 18 is interrupted. A drive position (D-position) selected by the shift operation of the shift lever 32 to the D-operation position is a forward running position at which a drive force causing a vehicle to run forward is transmitted to the drive wheels 14. For example, if the electronic control device 110 determines that the shift operation is performed to a predetermined operation position $P_{SH}$ (specifically, the R-operation position, the N-operation position, or the D-operation position) at which the movement prevention (parking lock) of the vehicle 10 is canceled based on the shift lever position signal when the shift position is the P-position, the electronic control device 110 outputs to the shift switching mechanism 16 the shift position switching control command signal making the switch to the shift position corresponding to the operation position $P_{SH}$ to cancel the parking lock and make the switch to the shift position given that a predetermined condition such as brake-on is satisfied.

A B-position selected by the shift operation of the shift lever 32 to the B-operation position is a deceleration forward running position (engine brake range) at which engine brake effect is exerted at the D-position to decelerate the rotation of the drive wheels 14. Therefore, the electronic control device 110 disables the shift operation if the shift lever 32 is shift-operated to the B-operation position when the current shift position is a shift position other than the D-position and enables the shift operation to the B-operation position only in the case of the D-position. For example, if a driver performs a shift operation to the B-operation position during the P-position, the shift position remains at the P-position.

Since the shift lever 32 returns to the M-operation position when the external force acting thereon disappears in the shift operating device 30 of this embodiment, the shift position being selected cannot be recognized by only visually recognizing the operation position $P_{SH}$ of the shift lever 32. Therefore, the indicator 40 is disposed at an easily viewable position for a driver to display on the indicator 40 the shift position being selected including the case of the P-position.

This embodiment employs so-called shift-by-wire and, since the shift operating device 30 is two-dimensionally shift-operated in a first direction P1 that is the longitudinal direction and a second direction P2 that is the lateral direction intersecting with (in FIG. 2, orthogonal to) the direction, the shift operating device 30 includes the shift sensor 36 as a first-direction detecting portion that detects a shift operation in the first direction P1 and the select sensor 38 as a second-direction detecting portion that detects a shift operation in the second direction P2, so as to output the operation position $P_{SH}$ as a detection signal of a position sensor to the electronic control device 110. Each of the shift sensor 36 and the select sensor 38 outputs to the electronic control device 110 a voltage as a detection signal (shift lever position signal) corresponding to the operation positions $P_{SH}$, and the electronic control device 110 recognizes (judges) the operation position $P_{SH}$ based on the detection signal voltages. Therefore, the first-direction detecting portion (the shift sensor 36) and the second-direction detecting portion (the select sensor 38) make up an operation position detecting portion that detects the operation position $P_{SH}$ of the shift operating device 30 as a whole.

Describing one example of the recognition of the operation positions $P_{SH}$, a detection signal voltage $V_{SF}$ of the shift sensor 36 turns to voltage levels (voltages within a low-range, a mid-range, and a high-range) corresponding to positions that are a first-direction first position P1_1 indicative of the R-operation position, a first-direction second position P1_2 indicative of the M-operation position or the N-operation position, and a first-direction third position P1_3 indicative of the B-operation position or the D-operation position. A detection signal voltage $V_{SL}$ of the select sensor 38 turns to voltage levels (voltages within a low-range and a high-range) corresponding to positions that are a second-direction first position P2_1 indicative of the M-operation position or the B-operation position and a second-direction second position P2_2 indicative of the R-operation position, the N-operation position, or the D-operation position. The electronic control device 110 detects the detection signal voltages $V_{SF}$, $V_{SL}$ changing in this way to recognize the operation positions $P_{SH}$ (R-, N-, D-, M-, and B-operation positions) from the combinations of the voltage levels.

Figure 3:
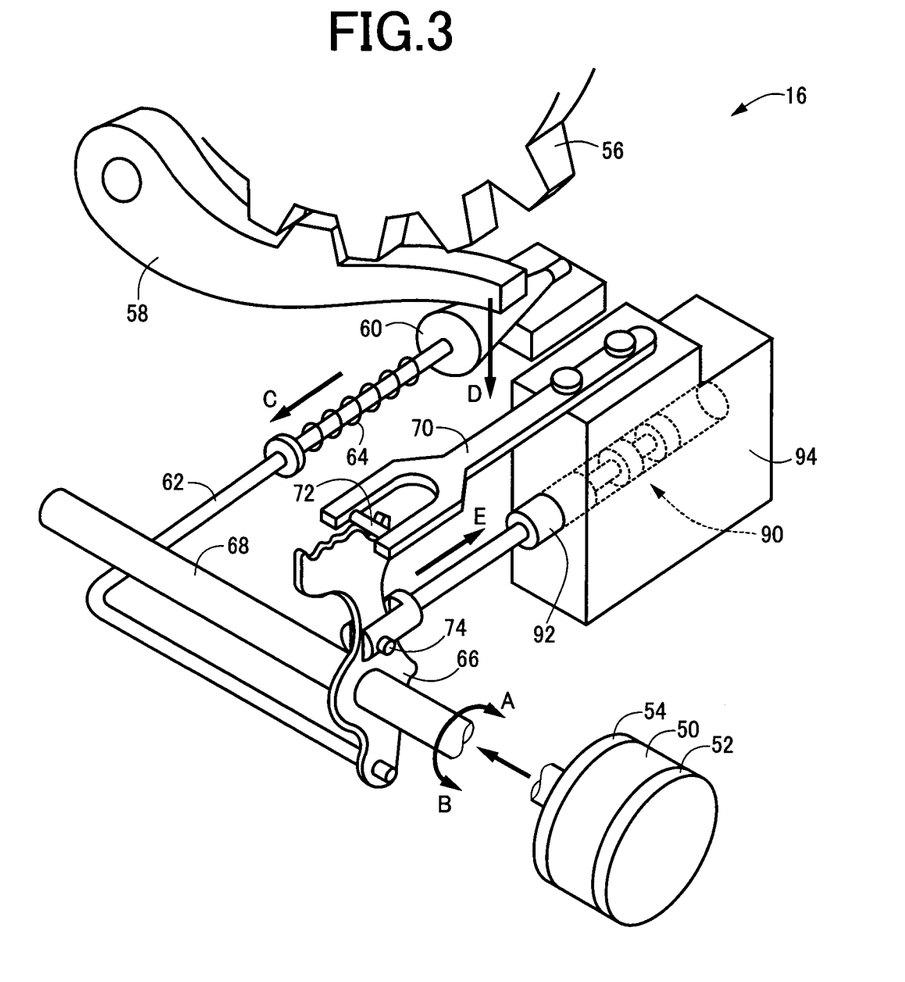
FIG. 3 is a perspective view of a configuration of the shift switching mechanism that electrically switches the shift position of the automatic transmission.

FIG. 3 is a perspective view of a configuration of the shift switching mechanism 16 that electrically switches the shift position of the automatic transmission 18 to the P-position, the R-position, the N-position, or the D-position with the drive motor 50 activated in accordance with the shift lever position signal and the P-switch signal and that also acts as a P-lock mechanism (parking lock mechanism) performing the parking lock to mechanically fix the rotation of the output gear 22 of the automatic transmission 18.

In FIG. 3, the shift switching mechanism 16 includes a parking gear 56 fixed to the output gear 22 of the automatic transmission 18 as the rotating teeth rotating together with wheels (the drive wheels 14); a parking lock pole 58 acting as the locking tooth disposed and enabled to rotate to an engagement position for engagement with the parking gear 56 and selectively engaged with the parking gear 56 to fix the output gear 22 in a non-rotatable manner; a parking rod 62 inserted into a tapered member 60 engaged with the parking lock pole 58 to support the tapered member 60 at one end; a spring 64 disposed on the parking rod 62 to bias the tapered member 60 toward a smaller diameter; a detent plate 66 rotatably connected to the other end of the parking rod 62 and positioned at a positioning position corresponding at least to the parking position with a moderation mechanism; a manual shaft 68 fixedly disposed on the detent plate 66 and supported rotatably around one shaft center; a drive motor 50 that rotationally drives the manual shaft 68; and a detent spring 70 and an engaging portion 72 disposed on a tip portion thereof that moderate the rotation of the detent plate 66 to fix the detent plate 66 to the positioning positions corresponding to the shift positions. Although a disposition location of the parking gear 56 is not limited as long as the parking gear 56 is in a relationship that the locked state thereof causes the locked state of the drive wheels 14, the parking gear 56 is concentrically fixed to the output gear 22 of the automatic transmission 18, for example (see FIG. 1).

On the detent plate 66, one end of a spool valve piece 92 of a manual valve 90 is disposed via a pin 74 disposed on the detent plate 66 to be rotatable around the pin 74 and movable relatively to the detent plate 66 in a linear direction linking the manual shaft 68 and the pin 74, and the spool valve piece 92 of the manual valve 90 is slid in the shaft center direction of the spool valve piece 92 in association with the rotation of the manual shaft 68, i.e., the rotation of the detent plate 66 around the shaft center of the manual shaft 68. In a valve body 94 that slidably houses the spool valve piece 92, a portion of an oil passage is disposed that makes up a hydraulic control circuit not depicted related to a solenoid valve etc., for controlling the shifting activation etc., of the automatic transmission 18. The manual valve 90 has the oil passage switched in accordance with the slide of the spool valve piece 92 and outputs an input line oil pressure PL as a drive position oil pressure PD at the D-position, outputs the input line oil pressure PL as a reverse position oil pressure PR at the R-position, and interrupts the output of the line oil pressure PL at the N-position or the P-position, for example.

The detent plate 66 is operably coupled via the manual shaft 68 to the drive motor 50 and is driven by the drive motor 50 along with the parking rod 62, the detent spring 70, the engaging portion 72, etc., to act as a shift position positioning member when the shift position is switched. At the top portion of the detent plate 66, four concave portions are formed that are disposed correspondingly to a parking position command position P, a reverse position command position R, a neutral position command position N, and a drive position command position D between a pair of inner wall surfaces 76, 78 as depicted in FIG. 4, and a concave portion 80 located at an edge among them corresponds to the parking position command position P.

FIG. 3 depicts the shift position set to the parking position, i.e., a locked state in which the shift switching mechanism 16 is put into the parking lock. In this locked state, the parking lock pole 58 non-rotatably fixes the parking gear 56 to prevent the rotation of the output gear 22 of the vehicle 10. If the manual shaft 68 is rotated from this state in the direction of an arrow A depicted in FIG. 3 by the drive motor 50 receiving the shift position switching control command for the shift switching activation from the electronic control device 110, the parking rod 62 is moved via the detent plate 66 in the direction of an arrow C depicted in FIG. 3, and the parking lock pole 58 is allowed to move in the direction of an arrow D depicted in FIG. 3 due to movement of the tapered member 60 disposed at the tip of the parking rod 62 while the spool valve piece 92 of the manual valve 90 is slid in the direction of an arrow E depicted in FIG. 3, i.e., in the shaft center direction of the spool valve piece 92.

Figure 4:
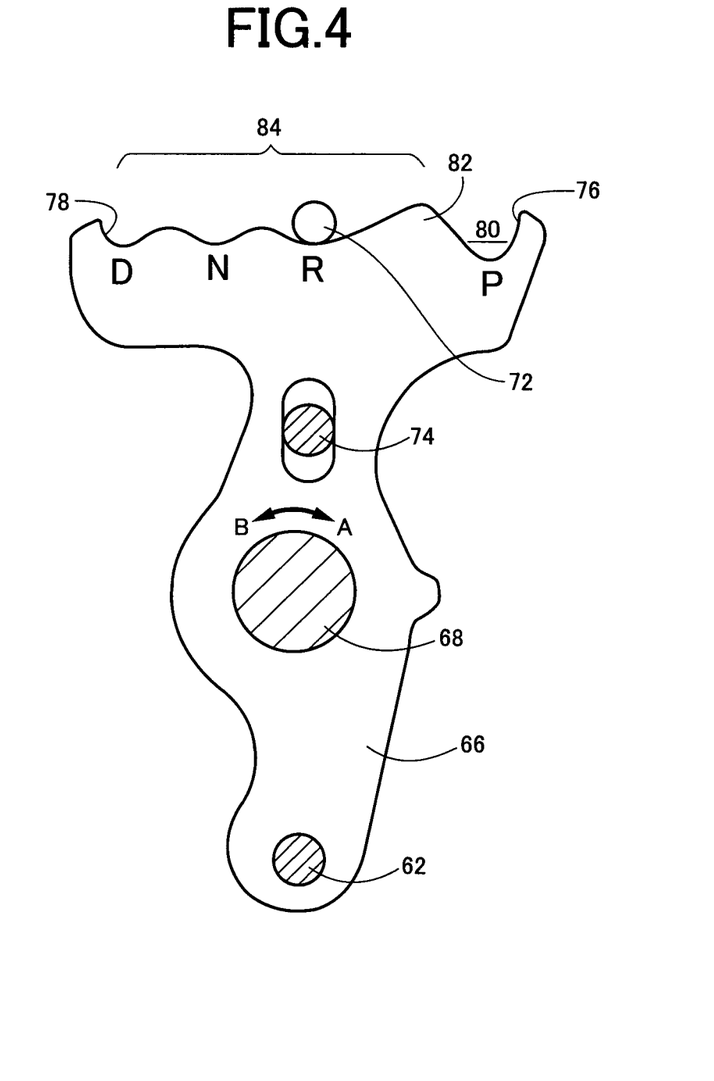
FIG. 4 is a diagram of an example of a detent plate of the shift switching mechanism

In association with the activation of the drive motor 50, i.e., the rotation of the detent plate 66, the engaging portion 72 of the detent spring 70 in the concave portion 80 located at the edge of the four concave portions disposed at the top portion of the detent plate 66 depicted in FIG. 4 is driven to climb over a convex portion 82 and move onto one of the other valleys, i.e., a successive concave portion 84 depicted in FIG. 4. The engaging portion 72 is disposed rotatably around the shaft center thereof on the detent spring 70. When the detent plate 66 is rotated in the direction of the arrow A until the engaging portion 72 reaches the successive concave portion 84, the parking lock pole 58 is pushed down in the direction of the arrow D to a position causing no engagement with the parking gear 56. As a result, the output gear 22 and the drive wheels 14 of the vehicle 10 coupled thereto are no longer mechanically fixed. The oil passage of the manual valve 90 is switched by the spool valve piece 92 positioned at a location corresponding to the switched successive concave portion 84. On the other hand, if the manual shaft 68 is rotated in the direction of the arrow B by the drive motor 50, the shift position is switched to the parking position in accordance with the activation opposite to that described above and the oil passage of the manual valve 90 is switched to the state corresponding to the parking position.

As described above, in the shift switching mechanism 16 of this embodiment, the drive motor 50 is controlled by the electronic control device 110 in accordance with the shift lever position signal and the P-switch signal output from the shift operating device 30, and the manual shaft 68 is rotated around the shaft center thereof. As a result, the spool valve piece 92 of the manual valve 90 is mechanically moved via the detent plate 66 in a linear direction, and the spool valve piece 92 is positioned at a position corresponding to one of the four shift positions, i.e., the drive position, the reverse position, the neutral position, and the parking position, thereby switching the oil passage of the hydraulic control circuit. The shift switching mechanism 16 switches the parking gear 56 acting as the rotating teeth rotating along with the drive wheels 14 acting as wheels, between the locked state, in which the parking lock pole 58 acting as the locking tooth engages with the parking gear 56, and the unlocked state achieved by releasing the locked state, based on a driver's operation.

Figure 5:
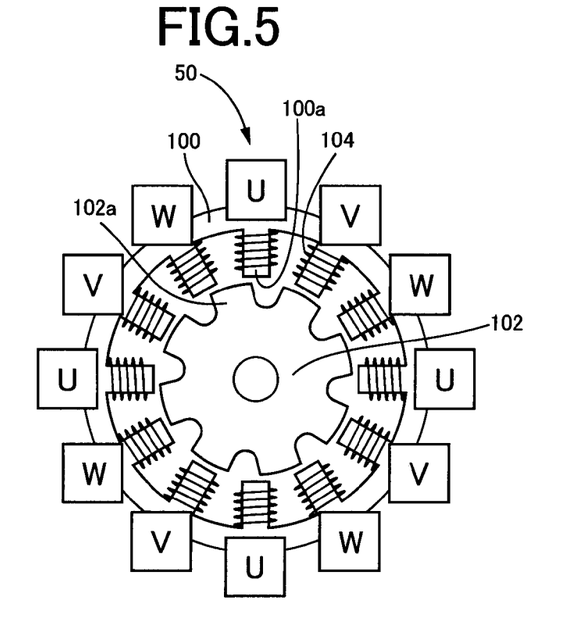
FIG. 5 is a schematic of a configuration of the drive motor.

FIG. 5 is a schematic of a configuration of the drive motor 50. In FIG. 5, the drive motor 50 is a motor used as a drive source of the shift switching mechanism 16 and is made up of a step motor such as a switched reluctance motor (SR motor), for example. The drive motor 50 is an SR motor with both a stator 100 and a rotor 102 having a salient pole configuration, for example, and has an advantage that the configuration is simple without the need for a permanent magnet.

For example, 12 salient poles 100a are formed at regular intervals on an inner circumferential portion of the cylindrical stator 100. On the other hand, for example, eight salient poles 102a are formed at regular intervals on an outer circumferential portion of the rotor 102 and the salient poles 102a of the rotor 102 are sequentially opposed to each of the salient poles 100a of the stator 100 via a minute gap in association with rotation of the rotor 102. A total of twelve windings 104 of three phases, i.e., a U-phase, a V-phase, and a W-phase, is wrapped around the 12 salient poles 100a of the stator 100 by rotation. A total of the twelve windings 104 of the U-phase, the V-phase, and the W-phase is wrapped around the 12 salient poles 100a of the stator 100 in the winding order of V-phase, W-phase, U-phase, V-phase, W-phase, U-phase, V-phase, W-phase, U-phase, V-phase, W-phase, and U-phase, for example, as depicted in FIG. 5. The numbers of the salient poles 100a of the stator 100 and the salient poles 102a of the rotor 102 are not particularly limited and may be changed as needed.

Figure 6:
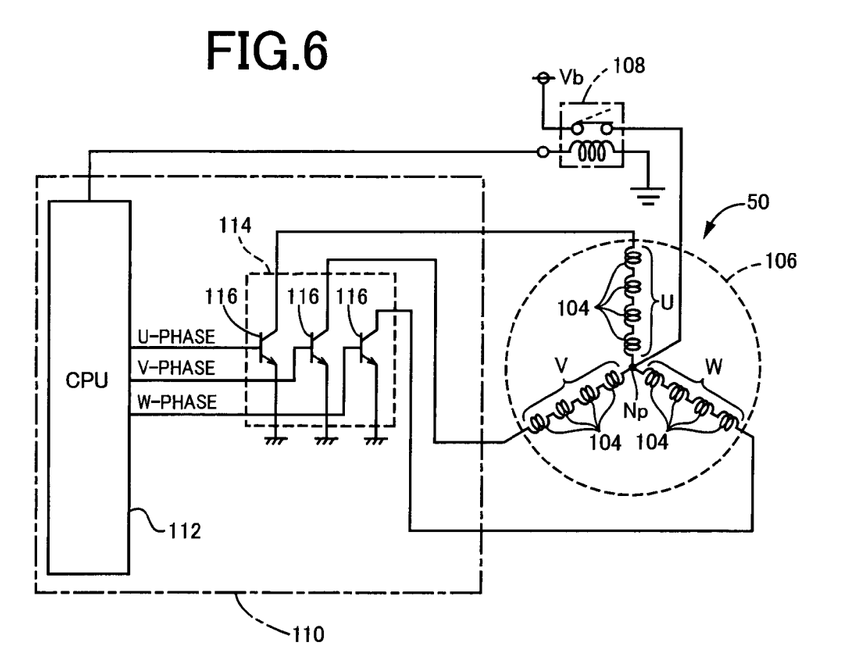
FIG. 6 is a circuit configuration diagram of an example of a drive circuit for driving the drive motor.

FIG. 6 is a circuit configuration diagram of a drive circuit for driving the drive motor 50. In FIG. 6, in the drive motor 50, the four windings 104 of each of the phases U, V, and W are connected in series and a total of the twelve windings 104 of the phases U, V, and W is in Y-connection to make up one system of a drive coil 106. The drive coil 106 is driven by a motor driver 114, using a battery not depicted mounted on the vehicle 10 as a power source Vb. Although the circuit configuration example of the motor driver 114 depicted in FIG. 6 has a circuit configuration of a unipolar drive mode with one switching transistor 116 disposed for each of the phases U, V, and W, a circuit configuration of a bipolar drive mode may be employed with the two switching transistors 116 disposed for each of the phases U, V, and W.

This embodiment is configured such that a neutral point Np of the drive coil 106 coupled to one ends of the windings 104 of the phases U, V, and W of the drive coil 106 is connected to the side of a positive electrode (voltage Vb) of a battery while the other ends of the windings 104 of the phases U, V, and W of the drive coil 106 are respectively connected to the switching transistors 116 of the motor driver 114. ON/OFF of the switching transistors 116 of the motor driver 114 is controlled by a CPU 112 of the electronic control device 110. For example, a motor relay 108 is connected between the neutral point of the drive coil 106 and the positive electrode (voltage Vb) of the battery. The motor relay 108 is set to be ON (the conduction side) by a command signal from the CPU 112 of the electronic control device 110 when a vehicle is powered on.

The drive motor 50 configured as described above is coupled via a reduction gear etc., to the manual shaft 68 and rotationally drives the manual shaft 68 to drive the shift switching mechanism 16 through a shift-by-wire system in response to a command (control signal) from the electronic control device 110. At this time, a pulse signal output from the encoder 52 integrally disposed on the drive motor 50 is supplied to the electronic control device 110. The encoder 52 is, for example, a magnetic rotary encoder that detects a rotation angle of the rotor 102 and is configured to output pulse signals of an A-phase, a B-phase, and a Z-phase to the electronic control device 110 in synchronization with the rotation of the rotor 102 of the drive motor 50.

The electronic control device 110 counts both the rising/falling edges of the A-phase signal and the B-phase signal output from the encoder 52 and changes the conduction phase of the drive motor 50 in a predetermined order with the motor driver 114 depending on the encoder count value to rotationally drives the drive motor 50. At this time, the rotation direction of the rotor 102 is determined from the order of occurrence of the A-phase signal and the B-phase signal and, for example, the encoder value is counted up in the case of positive rotation (rotation direction of P-position→D-position) and the encoder value is counted down in the case of negative rotation (rotation direction of D-position→P-position). As a result, since the correspondence relationship between the encoder count value and the rotation angle of the drive motor 50 is maintained when the drive motor 50 rotates in either direction of the positive/negative rotation, the rotation angel of the drive motor 50 is detected from the encoder count value in either rotation direction of the positive/negative rotation, and the windings 104 of the phase corresponding to the rotation angle are energized to rotationally drive the drive motor 50. The Z-phase signal of the encoder 52 is used for detecting the reference rotation angle of the rotor 102.

The neutral switch sensor 54 disposed on the drive motor 50 is a noncontact rotation angle sensor made up of a rotation angle sensor (e.g., potentiometer) having an output signal (output voltage) linearly changed depending on the rotation angle of the manual shaft 68 (the rotation angle of the detent plate 66). This output signal (output voltage) is input as the rotation angle signal and the shift-position position signal to the electronic control device 110 and, based on the magnitude of this output signal (output voltage), determinations are made on the rotation angle of the manual shaft 68 as well as valve positions "P", "R", "N", and "D" of the manual valve 90, i.e., the shift position of the automatic transmission 18.

In the shift switching mechanism 16 configured as described above, for example, if a driver operates the shift operating device 30, the electronic control device 110 sets a target rotation angle (target value of the encoder count value) corresponding to the shift position selected by the shift operating device 30, and a rotation speed (rotation speed (motor rotation speed) $N_M$ of the drive motor 50) until the target rotation angle is achieved. The electronic control device 110 starts energizing the drive motor 50 to rotationally drive the drive motor 50 at the set motor rotation speed $N_M$ such that the drive motor 50 is stopped at the position at which the detected rotation angle (encoder count value) of the drive motor 50 matches the target rotation angle, for example. The electronic control device 110 determines the rotation angle of the manual shaft 68 based on the output signal from the neutral switch sensor 54, i.e., determines whether the shift position of the automatic transmission 18 is the P-position, the R-position, the N-position, or the D-position to determine whether the shift position is normally switched.

The drive motor 50 made up of a three-phase step motor as in this embodiment can employ an excitation mode such as a one-phase excitation mode, a two-phase excitation mode, and a one-two-phase excitation mode as depicted in FIG. 9, for example. For example, if the one-two-phase excitation mode is employed, a step angle relative to a reference pulse is halved as compared to the case of the one-phase excitation mode or the two-phase excitation mode, thereby enabling smooth and fine motor rotation control. A relatively larger output torque (motor torque) $T_M$ of the drive motor 50 is also acquired. However, the one-two-phase excitation mode requires a doubled drive pulse (communication pulse) as compared to the one-phase excitation mode and the two-phase excitation mode, and a processing load is increased in the CPU 112 of the electronic control device 110. Since the processing load of the CPU 112 is more increased particularly when the drive motor 50 is driven at higher speed, the CPU 112 is required to have higher processing capacity in the one-two-phase excitation mode as compared to the one-phase excitation mode and the two-phase excitation mode.

For example, while the vehicle 10 stops on a slope road, when the shift position is at the P-position and the parking gear 56 and the parking lock pole 58 are engaged, if the shift position is switched from the P-position to a non-P position, i.e., when the P-lock is released, a necessary motor torque $T_M'$ necessary for the drive motor 50 of the shift switching mechanism 16 is thought to be highest. On the other hand, in the shift position switching control other than releasing the P-lock, the shift position can be switched if torque exists that overcomes the detent spring 70 holding the spool valve piece 92 of the manual valve 90 of the automatic transmission 18, for example, and significantly lower torque is thought to be sufficient for the necessary motor torque $T_M'$ as compared to the case of releasing the P-lock. In the shift position switching control other than releasing the P-lock, responsiveness of switching of the shift position may be required rather than the larger motor torque $T_M$. For example, if a brake is turned off at the same time with a user's pressing operation of the P-switch 34 while the vehicle 10 is stopped with the D-position by turning on the brake on a slope road, the vehicle 10 may move on the slope rode unless the shift position switching control from the D-position to the P-position is quickly completed. Therefore, it is desired to reduce the processing load of the CPU 112 as far as possible while ensuring the output property of the drive motor 50 (e.g., the necessary motor torque $T_M'$ and the motor rotation speed $N_M$ for ensuring the responsiveness) necessary for switching the shift position.

Therefore, in this embodiment, if first shift switching control is provided that is determined in advance as the shift position switching control giving higher priority to the higher output (high motor torque $T_M$) of the drive motor 50 rather than the responsiveness of switching of the shift position of the automatic transmission 18, the electronic control device 110 sets the excitation method of the drive motor 50 to the one-two-phase excitation mode (i.e., the drive motor 50 is driven in the one-two-phase excitation mode) and sets the motor rotation speed $N_M$ of the drive motor 50 to a first motor rotation speed $N_M 1$ that is a predetermined first rotation speed. In contrast, if second shift switching control is provided that is determined in advance as the shift position switching control giving higher priority to the responsiveness of switching of the shift position of the automatic transmission 18 rather than the higher output (high motor torque $T_M$) of the drive motor 50, the electronic control device 110 sets the excitation method of the drive motor 50 to the one-phase excitation mode or the two-phase excitation mode (i.e., the drive motor 50 is driven in the one-phase excitation mode or the two-phase excitation mode) and sets the motor rotation speed $N_M$ of the drive motor 50 to a second motor rotation speed $N_M 2$ that is a predetermined second rotation speed higher than the first motor rotation speed $N_M 1$. The first motor rotation speed $N_M 1$ is a motor rotation speed empirically obtained and set in advance for suppressing a processing load within a range that can sufficiently be supported by the current CPU 112 without using a higher-performance CPU even if the excitation method of the drive motor 50 is set to the one-two-phase excitation mode, in which the processing load of the CPU 112 becomes relatively high, for example. The second motor rotation speed $N_M 2$ is a motor rotation speed empirically obtained and set in advance for suppressing a processing load within a range that can sufficiently be supported by the current CPU 112 without using a higher-performance CPU and for improving the responsiveness of switching of the shift position as much as possible if the excitation method of the drive motor 50 is set to the one-phase excitation mode or the two-phase excitation mode, in which the processing load of the CPU 112 becomes relatively low, for example.

The first shift switching control is the switching control of switching the shift position from the P-position to a non-P position, i.e., the switching control of releasing the P-lock, for example. The second shift switching control is the switching control of switching the shift position from a non-P position to the P-position, i.e., the switching control of performing the P-lock, for example. Although either the first shift switching control or the second shift switching control may be provided to handle the shift position switching control other than the switching control of releasing the P-lock and the switching control of performing the P-lock, for example, the shift position switching control between the D-position and the N-position, the shift position switching control between the R-position and the N-position, and the shift position switching control between the D-position and the R-position, since the higher motor torque $T_M$ is not requested as compared to the switching control of releasing the P-lock, it is desired to provide the second shift switching control as is the case with the switching control of performing the P-lock. Therefore, the second shift switching control may be the shift position switching control other than the switching control of releasing the P-lock.

Figure 7:
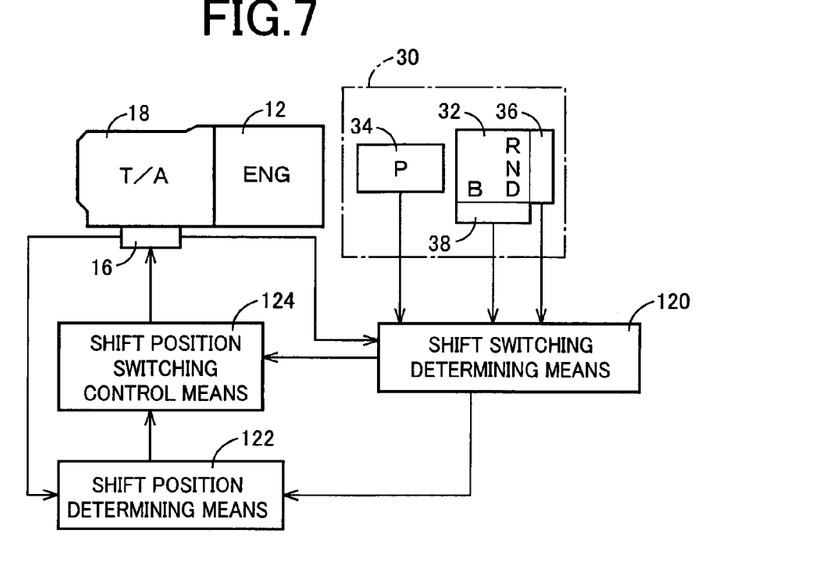
FIG. 7 is a functional block line diagram for explaining a main portion of the control function of the electronic control device.

More specifically, FIG. 7 is a functional block line diagram for explaining a main portion of the control function of the electronic control device 110. In FIG. 7, a shift switching determining portion, i.e., a shift switching determining means 120 determines the operation position $P_{SH}$ requested by a driver based on the detection signal voltages $V_{SF}$, $V_{SL}$ from the shift sensor 36 and the select sensor 38 and determines whether a shift operation by the driver is performed for switching the shift position of the automatic transmission 18. The shift switching determining means 120 determines whether a shift operation by the driver is performed for switching the shift position of the automatic transmission 18 to the P-position based on the P-switch signal from the P-switch 34. In other words, the shift switching determining means 120 determines whether the driver requests switching of the shift position of the automatic transmission 18, based on the detection signal voltages $V_{SF}$, $V_{SL}$ and the P-switch signal. The shift switching determining means 120 determines whether the switching of the shift position of the automatic transmission 18 requested by the driver needs to be performed, based on the shift position of the automatic transmission 18 based on the output signal from the neutral switch sensor 54, for example.

If the shift switching determining means 120 determines that the switching of the shift position of the automatic transmission 18 needs to be performed, a shift position determining portion, i.e., a shift position determining means 122 determines whether the shift position of the automatic transmission 18 is the P-position, based on the output signal from the neutral switch sensor 54. In other words, the shift position determining means 122 determines whether the shift position switching control of the automatic transmission 18 determined necessary to be performed by the shift switching determining means 120 is the shift position switching control from the P-position to a non-P position, i.e., the switching control of releasing the P-lock (the first shift switching control).

When performing the shift position switching determined by the shift switching determining means 120, if the shift position determining means 122 determines that the shift position switching control of the automatic transmission 18 is the switching control of releasing the P-lock (the first shift switching control), a shift position switching control portion, i.e., a shift position switching control means 124 drives the drive motor 50 in the one-two-phase excitation mode and turns the motor rotation speed $N_M$ of the drive motor 50 to the first motor rotation speed $N_M1$ set as a relatively low rotation speed. On the other hand, when performing the shift position switching determined by the shift switching determining means 120, if the shift position determining means 122 determines that the shift position switching control of the automatic transmission 18 is not the switching control of releasing the P-lock, i.e., is the shift position switching control other than the switching control of releasing the P-lock (the second shift switching control), the shift position switching control means 124 drives the drive motor 50 in the one-phase excitation mode or the two-phase excitation mode and turns the motor rotation speed $N_M$ of the drive motor 50 to the second motor rotation speed $N_M2$ set as a relatively high rotation speed.

Figure 8:
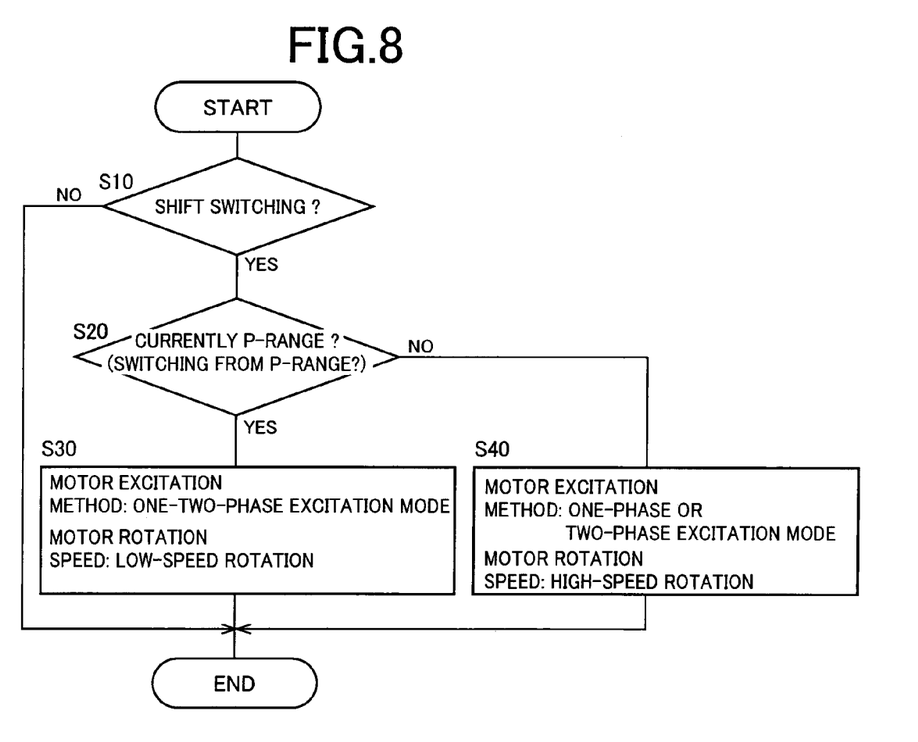
FIG. 8 is a flowchart for explaining a main portion of the control operation of the electronic control device, i.e., the control operation for satisfying both the output property of the drive motor necessary for switching the shift position and the processing load reduction in the CPU

FIG. 8 is a flowchart for explaining a main portion of the control operation of the electronic control device 110, i.e., the control operation for satisfying both the output property of the drive motor 50 necessary for switching the shift position (e.g., the necessary motor torque $T_M'$ and the motor rotation speed $N_M$ for ensuring the responsiveness) and the processing load reduction in the CPU 112, which is repeatedly executed with an extremely short cycle time, for example, on the order of a few msec to a few tens of msec.

First, at step (hereinafter, "step" will be omitted) S10 in FIG. 8 corresponding to the shift switching determining means 120, it is determined whether a driver requests switching of the shift position of the automatic transmission 18, based on the detection signal voltages $V_{SF}$, $V_{SL}$ and the P-switch signal, for example. It is then determined whether the switching of the shift position of the automatic transmission 18 requested by the driver needs to be performed, based on the shift position of the automatic transmission 18 based on the output signal from the neutral switch sensor 54, for example. If the determination at S10 is negative, this routine is terminated and, if affirmative, at S20 corresponding to the shift position determining means 122, it is determined whether the shift position of the automatic transmission 18 is the P-position, based on the output signal from the neutral switch sensor 54. In other words, it is determined whether the shift position switching control of the automatic transmission 18 determined at S10 is the shift position switching control from the P-position to a non-P position, i.e., the switching control of releasing the P-lock (the first shift switching control). If the determination at S20 is affirmative, at S30 corresponding to the shift position switching control means 124, when the switching of the shift position of the automatic transmission 18 determined at S10 is performed, the drive motor 50 is driven in the one-two-phase excitation mode and the motor rotation speed $N_M$ of the drive motor 50 is turned to the first motor rotation speed $N_M1$ set as a relatively low rotation speed. On the other hand, if the determination at S20 is negative, at S40 also corresponding to the shift position switching control means 124, when the switching of the shift position of the automatic transmission 18 determined at S10 is performed, the drive motor 50 is driven in the one-phase excitation mode or the two-phase excitation mode and the motor rotation speed $N_M$ of the drive motor 50 is turned to the second motor rotation speed $N_M2$ set as a relatively high rotation speed.

As described above, according to this embodiment, if the first shift switching control is provided that gives higher priority to the higher output (high motor torque $T_M$) of the drive motor 50 rather than the responsiveness of switching of the shift position of the automatic transmission 18, the drive motor 50 is driven in the one-two-phase excitation mode and the motor rotation speed $N_M$ of the drive motor 50 is turned to the first motor rotation speed $N_M1$ set as a relatively low rotation speed and, therefore, the necessary motor torque $T_M'$ of the drive motor 50 necessary for switching the shift position can be acquired and the CPU processing load is suppressed since a lower speed rotation of the drive motor 50 is sufficient even in the one-two-phase excitation mode, which increases the processing load of the CPU 112 as compared to the one-phase excitation mode or the two-phase excitation mode. On the other hand, if the second shift switching control is provided that gives higher priority to the responsiveness of switching of the shift position rather than the higher output (high motor torque $T_M$) of the drive motor 50, the drive motor 50 is driven in the one-phase excitation mode or the two-phase excitation mode and the motor rotation speed $N_M$ of the drive motor 50 is turned to the second motor rotation speed $N_M2$ set as a relatively high rotation speed and, therefore, the necessary motor torque $T_M'$ of the drive motor 50 necessary for switching the shift position can be acquired and the CPU processing load is suppressed since the one-phase excitation mode or the two-phase excitation mode is used that causes a lower processing load of the CPU 112 as compared to the one-two-phase excitation mode if the drive motor 50 is turned to a higher rotation speed. As described above, the switching of the motor rotation speed $N_M$ and the excitation method of the drive motor 50 depending on a type of the shift position switching can satisfy both the output property of the drive motor 50 necessary for switching the shift position (e.g., the necessary motor torque $T_M'$ and the motor rotation speed $N_M$ for ensuring the responsiveness) and the processing load reduction in the CPU 112. Therefore, for example, as compared to the case of driving the drive motor 50 in the one-two-phase excitation mode causing a higher processing load of the CPU 112 and at the second motor rotation speed $N_M2$ set as a relatively high rotation speed, the processing load of the CPU 112 can be reduced and an inexpensive system can be established by lowering the grade (performance) of the CPU 112, for example, by changing a 32-bit CPU to a 16-bit CPU.

According to this embodiment, the first shift switching control is the switching control from the P-position to a non-P position and, therefore, the switching control from the P-position to a non-P position is appropriately provided that may require the high motor torque $T_M$ of the drive motor 50 rather than the responsiveness of switching of the shift position. The second shift switching control is the switching control from a non-P position to the P-position and, therefore, the switching control from a non-P position to the P-position is appropriately provided that may require the responsiveness of switching of the shift position rather than the high motor torque $T_M$ of the drive motor 50.

According to this embodiment, the second shift switching control is the shift position switching control other than the switching control from the P-position to a non-Parking position and, therefore, the shift position switching control other than the switching control from the P-position to a non-Parking position is appropriately provided that does not relatively require the high motor torque $T_N$ of the drive motor 50.

According to this embodiment, the drive motor 50 is a three-phase step motor and, therefore, the switching of the motor rotation speed $N_M$ and the excitation method depending on a type of the shift position switching can satisfy both the output property of the drive motor 50 necessary for switching the shift position and the processing load reduction in the CPU 112.

Although the embodiment of the present invention has been described in detail with reference to the drawings, the present invention is applicable in other forms.

Figure 10:
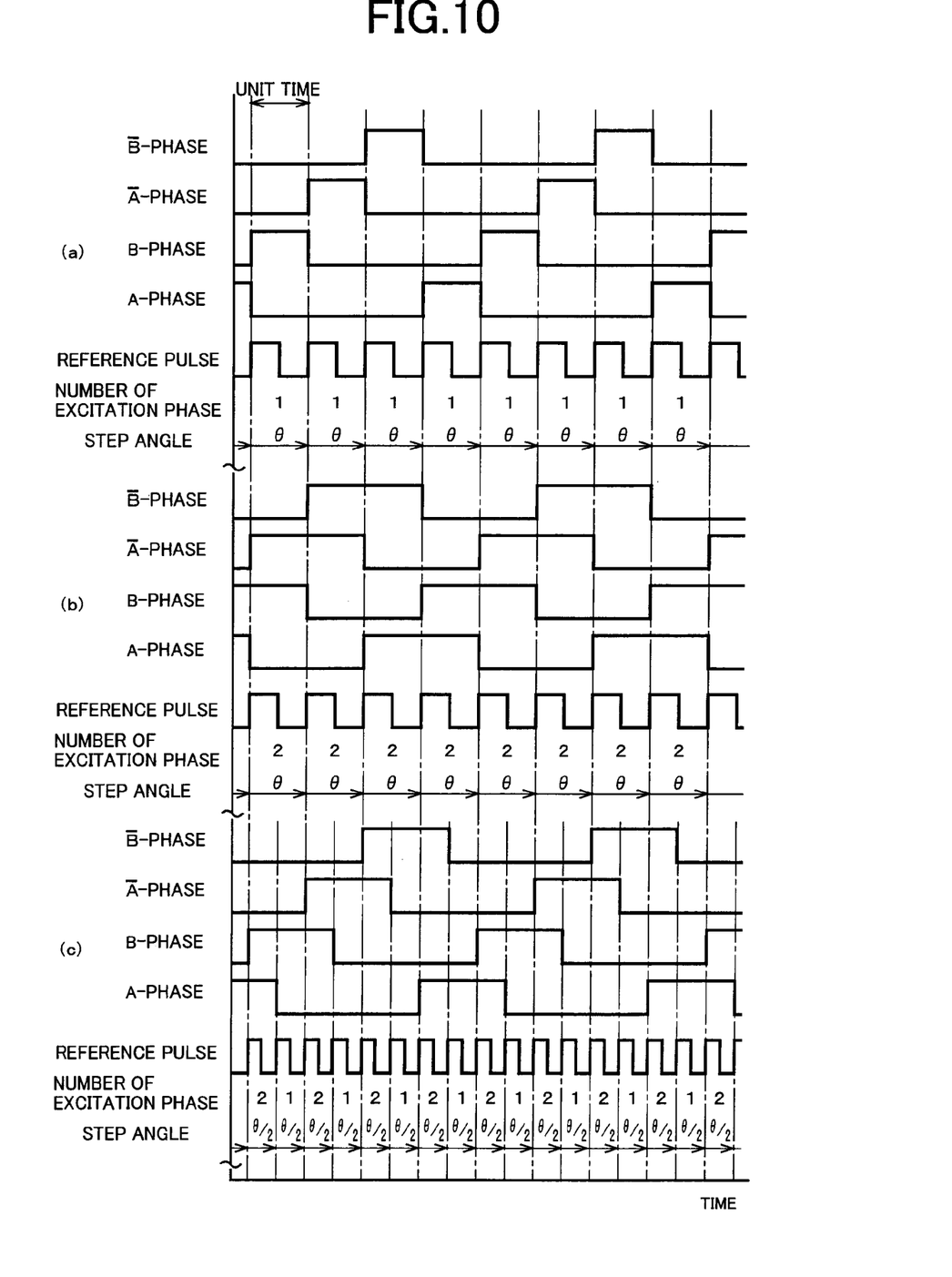
FIG. 10 is a diagram of an example of an excitation method when a two-phase step motor is used and (a), (b), and (c) are diagrams exemplarily illustrating the one-phase excitation mode, the two-phase excitation mode, the one-two-phase excitation mode, respectively.

For example, although a three-phase SR motor is used as the drive motor 50 in the embodiment, this is not a limitation and another type of a step motor may be used that detects the rotation position of the rotor based on the count value of the output signal of the encoder 52 to sequentially switch the conduction phase of the motor. For example, the present invention may be applicable even in the case of a two-phase step motor, a four-phase step motor, or a five-phase step motor. FIG. 10 is a diagram of an example of an excitation method when a two-phase step motor is used and (a), (b), and (c) are diagrams exemplarily illustrating the one-phase excitation mode, the two-phase excitation mode, the one-two-phase excitation mode, respectively. Although the drive motor 50 is configured such that the four windings 104 of each of the phases U, V, and W are connected in series and a total of the twelve windings 104 of the phases U, V, and W is in Y-connection to make up one system of the drive coil 106, a dual-coil drive motor having two systems of the same drive coils 106 may be used.

Although the encoder 52 and the neutral switch sensor 54 are configured to be disposed on the drive motor 50 in the embodiment, this configuration is not necessarily a limitation. For example, the neutral switch sensor 54 may be disposed outside the drive motor 50 to directly detect the rotation of the manual shaft 68. Although the encoder 52 is a magnetic rotary encoder and the neutral switch sensor 54 is a noncontact rotation angle sensor made up of a potentiometer etc., this is not a limitation and various sensors may be employed. For example, the encoder 52 may be an optical encoder or a brush encoder. Although the rotation angle of the manual shaft 68 (the rotation angle of the detent plate 66) is detected by the neutral switch sensor 54, this is not a limitation, and an operation amount (such as a rotation angle and a movement amount) may be detected from a part driven in a one-to-one relationship with the rotary drive of the manual shaft 68, as in the case of a slide amount of the spool valve piece 92 of the manual valve 90, for example.

Although the operating device for switching the shift position is the shift operating device 30 including the shift lever 32 and the P-switch 34 in the embodiment, this is not a limitation and any operating device may be employed that converts a driver's intention of shifting to an electric signal. For example, an operating device may be employed that includes operation positions (operation positions) such as "P", "R", "N", and "D" corresponding to shift positions, a shift lever (operation body) operated to the operation positions, and an operation position sensor that electrically detects that the shift lever is operated to the operation positions.

Although the embodiment is described as an example of applying the present invention to the shift switching mechanism 16 that makes the switch correspondingly to the shift positions of "P", "R", "N", and "D", the present invention is not necessarily limited to this example. For example, another shift switching mechanism may be employed, such as a shift switching mechanism that makes the switch correspondingly to added shift positions of a second range "2" and a low range "L" in addition to the shift positions of "P", "R", "N", and "D". The present invention is applicable to a shift switching mechanism that selectively switches two positions of the P-position and the non-P position in conjunction with the rotating movement of the detect plate 66.

Although one embodiment has been described above, the present invention can be implemented in variously modified or altered forms based on the knowledge of those skilled in the art.

NOMENCLATURE OF REFERENCE SIGNS

10: vehicle
14: drive wheels (wheels)
16: shift switching mechanism
18: automatic transmission
30: shift operating device (operating device)
50: drive motor (step motor)
56: parking gear (rotating teeth)
58: parking lock pole (locking tooth)
110: electronic control device (shift switching control device)

The invention claimed is:

1. A shift switching control device of a vehicle including a shift switching mechanism that electrically switches a shift position of an automatic transmission with activation of a step motor based on an operation signal indicative of an operating state of an operating device for switching a shift position of the automatic transmission, wherein
if a shift position switching control gives higher priority to higher output of the step motor rather than responsiveness of switching of a shift position, a first shift switching control is provided and configured to drive the step motor in a one-two-phase excitation mode and to set a rotation speed of the step motor to a predetermined first rotation speed, and wherein if the shift position switching control gives higher priority to responsiveness of switching of a shift position rather than higher output of the step motor, a second shift switching control is provided and configured to drive the step motor in a one phase excitation mode or a two phase excitation mode and to set a rotation speed of the step motor to a predetermined second rotation speed higher than the first rotation speed.

2. The shift switching control device of a vehicle of claim 1, wherein the first shift switching control is provided when the shift position switching control is a shift position switching control from a parking position that achieves a locked state with a locking tooth engaged with rotating teeth that rotate together with a wheel, to a non-parking position, and wherein the second shift switching control is provided when the shift position switching control is a shift position switching control from the non-parking position to the parking position.

3. The shift switching control device of a vehicle of claim 2, wherein the second shift switching control is provided when the shift position switching control is a shift position switching control other than the shift position switching control from the parking position to the non-parking position.

4. The shift switching control device of a vehicle of claim 3, wherein the step motor is a three-phase step motor.

5. The shift switching control device of a vehicle of claim 2, wherein the step motor is a three-phase step motor.

6. The shift switching control device of a vehicle of claim 1, wherein the step motor is a three-phase step motor.

* * * * *